United States Patent

Uhtenwoldt et al.

[15] 3,657,843
[45] Apr. 25, 1972

[54] INTERNAL GRINDING MACHINE
[72] Inventors: Herbert R. Uhtenwoldt, Worcester; William H. Grotewold, Holden; Edmund E. Wlodyka, Saxonville, all of Mass.
[73] Assignee: The Heald Machine Company, Worcester, Mass.
[22] Filed: Oct. 15, 1969
[21] Appl. No.: 866,653

[52] U.S. Cl.........................................51/103 R, 51/215 CP
[51] Int. Cl..............................................................B24b 5/18
[58] Field of Search.............................................51/215, 103

[56] References Cited

UNITED STATES PATENTS

| | | | |
|---|---|---|---|
| 1,840,841 | 1/1932 | Highberg | 51/215 H X |
| 2,711,056 | 6/1955 | Dix | 51/215 X |
| 1,517,971 | 12/1924 | Fassinger | 51/215 H UX |
| 2,671,293 | 3/1954 | Grobey | 51/215 H X |
| 2,692,535 | 10/1954 | Praeg | 51/215 H UX |
| 2,771,714 | 11/1956 | Schmidt | 51/215 X |
| 3,188,890 | 6/1965 | Fotsch | 51/215 X |

*Primary Examiner*—Harold D. Whitehead
*Attorney*—Norman S. Blodgett

[57] ABSTRACT

An internal grinding machine having a tool mounted only for transverse feeding movement with a workholder mounted for movement toward and away from the tool to feed the work into and out of grinding position. The workpieces are automatically loaded into the workholder in a retracted position from feed structure mounted on the base of the machine.

7 Claims, 3 Drawing Figures

HERBERT R. UHTENWOLDT
WILLIAM H. GROTEWOLD
EDMUND E. WLODYKA
INVENTORS.

INTERNAL GRINDING MACHINE

BACKGROUND OF THE INVENTION

In the machining of surfaces of workpieces successively presented to an automatic machine tool, a number of problems are experienced when the workpieces are large. For instance, in an internal grinding machine, it is necessary that the workhead be moved rapidly longitudinally and transversely relative to the abrasive wheel to bring about the grinding cycle. In most cases, the workhead must be rapidly reciprocated axially during the grinding. Also, it is desirable, especially when large workpieces are being ground, to have the workhead on the longitudinally reciprocated table, because the tangential cutting force is down on the workpiece, while the reactive force on the grinding wheel is in the upward direction. If the wheelhead were supported on the longitudinally reciprocated table, there would be a tendency to lift the table; since the rigidity of a hydrostatic way is high when the force is down and low when the force is up, it can be seen that an arrangement where the force is in the downward direction is particularly appropriate when large workpieces and large grinding forces are encountered. In the past, the loading chute and escapement mechanism have been mounted on the workhead; when the workpieces are large and heavy, however, this loading mechanism also becomes very heavy. When the chute is full of heavy workpieces, the resultant mass on the workhead makes it very difficult to move it through its cycle of movements with the necessary speed. Furthermore, in order to provide a chute with adequate storage capacity, the chute must extend a considerable distance forwardly and upwardly of the machine; the movement of such an extension would be dangerous and awkward in operation. These and other difficulties experienced with the prior art devices have been obviated in a novel manner by the present invention.

It is, therefore, an outstanding object of the invention to provide a machine tool permitting the automatic loading and unloading of large, heavy workpieces without adding to the mass of critical moving parts.

Another object of this invention is the provision of an internal grinding machine for grinding large, heavy workpieces, wherein massive loading apparatus with the storage of a large number of workpieces to be ground does not inhibit rapid workhead reciprocation and other cycle motions.

A further object of the present invention is the provision of a machine tool for generating an internal surface of revolution, wherein the workpiece is supported on an external surface of revolution and driven at one end and wherein a pressure clamp engages the other end to press the workpiece axially toward the driving means.

Another object of the invention is the provision of a grinding machine for use with large workpieces wherein the longitudinal motions take place in the workhead, wherein the forces in the workhead ways are downward, wherein the loading chute can be loaded without difficulty during the grinding cycle.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool having a base, having a workhead mounted on the base for movement along a path extending longitudinally thereof, and having a toolhead mounted on the base for movement transversely thereof. A chute is mounted on the base beside the path of the workhead and an escapement mechanism is mounted on the chute for releasing workpieces one at a time. A transfer arm is mounted on the workhead for swinging action about an axis extending parallel to the said path. Means is provided operative on the workhead to move it along the said path from a first position where the transfer arm is adjacent the chute to a second position adjacent the toolhead.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
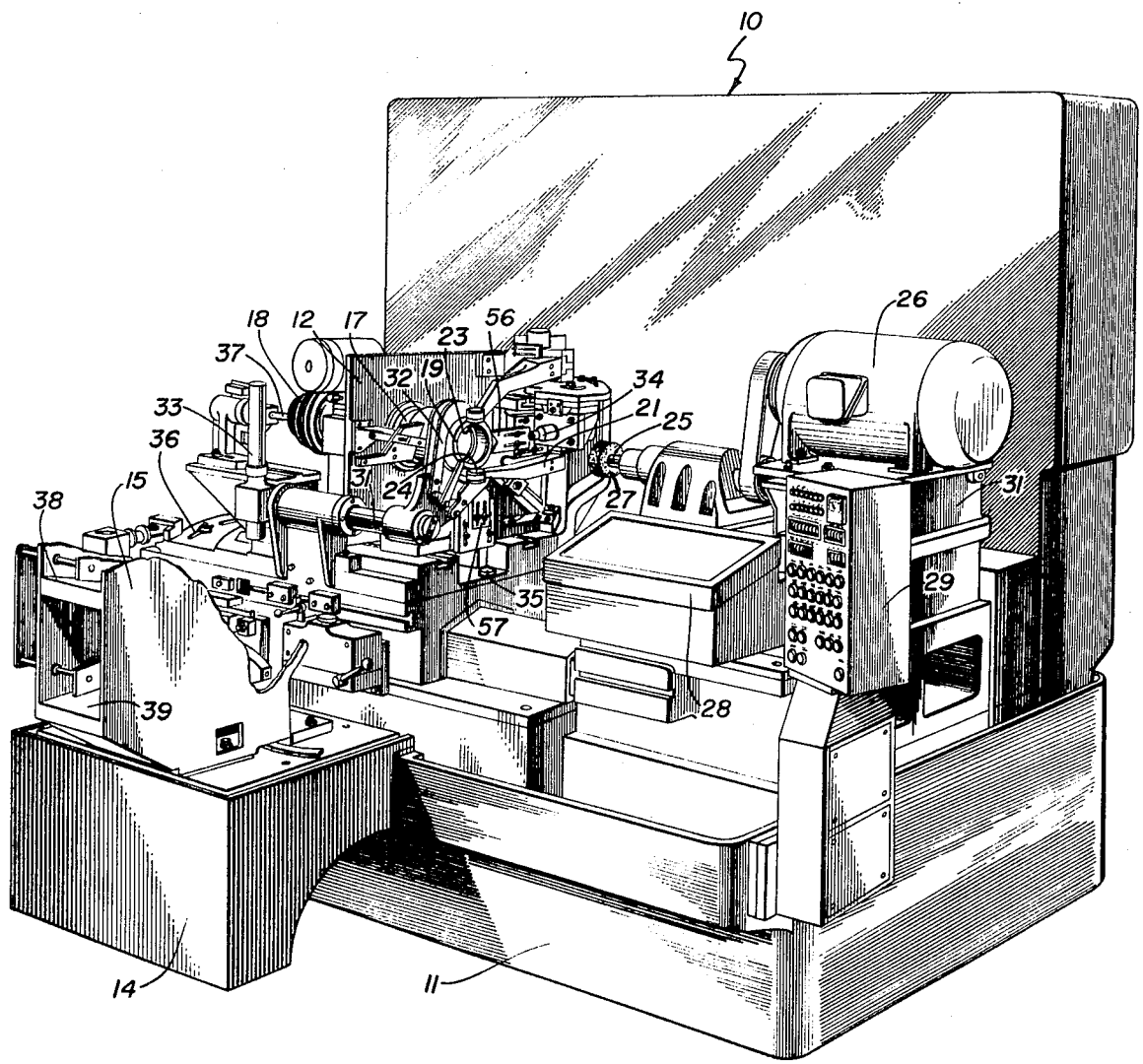
FIG. 1 is a perspective view of a machine tool embodying the principles of the present invention.

Referring first to FIG. 1, wherein are best shown the general features of the invention, the machine tool, indicated generally by the reference numeral 10, is shown as having a base 11 on which is mounted a workhead 12 and a wheelhead 13. At the front of the base is provided a forwardly extending extension 14 on the upper surface of which is mounted a chute support 15. The chute support 15 can be adjusted about a vertical axis so that the chute will extend at a right angle to the axis of the workpiece when a tapered bore is being ground. From the back of the base extends a cabinet 16 containing the usual hydraulic valves and electrical relays associated with the operation of the machine tool. The workhead is provided with a rotatably mounted hollow spindle 17; one end is provided with a pulley 18, while the other end engages one end of a workpiece 19. For the purpose of illustration, the workpiece is shown as the outer race of a large tapered roller bearing known as a "railroad bearing." The outer end of the workpiece is engaged by a clamping means, such as arms 21 and 22 having at their ends rollers 23 and 24. The workpiece is supported on its periphery on suitable shoes (see FIG. 2), and the machine tool is shown as an internal grinding machine for finishing a bore in the workpiece. The workhead 12 can be swivelled at an angle to the axis of the abrasive wheel 27 and to the longitudinal hydrostatic ways.

The wheelhead 13 is provided with a spindle 25 which is driven at one end by a motor 26 and which extends at the other end toward the workpiece and carries an abrasive wheel 27. Mounted at the front of the wheelhead is a feed box 28 having indicator means on its face; this feed apparatus is similar to that shown and described in the patent application of Edward G. Robillard, Ser. No. 720,912, filed Apr. 12, 1968. Attached to the base in position to be readily accessible to the operator is a free-standing control panel 29.

Extending from the front of the workhead 12 and extending parallel to the workpiece axis is a shaft 31 on which is mounted a transfer arm 32. A hydraulic cylinder 33 is mounted on the workhead for the rotation of the shaft 31 and the transfer arm 32 on occasion. A diamond dressing apparatus 34 is mounted on the workhead for the purpose of dressing the abrasive wheel 27. Means is provided to rotate the workhead 12 about a vertical pivotal axis to allow the grinding of tapered bores; the means includes a pivot 35 underlying the workpiece and slots 36 concentric therewith. A gage 37 extends through the hollow spindle 17 into the bore in the workpiece.

Figure 2:
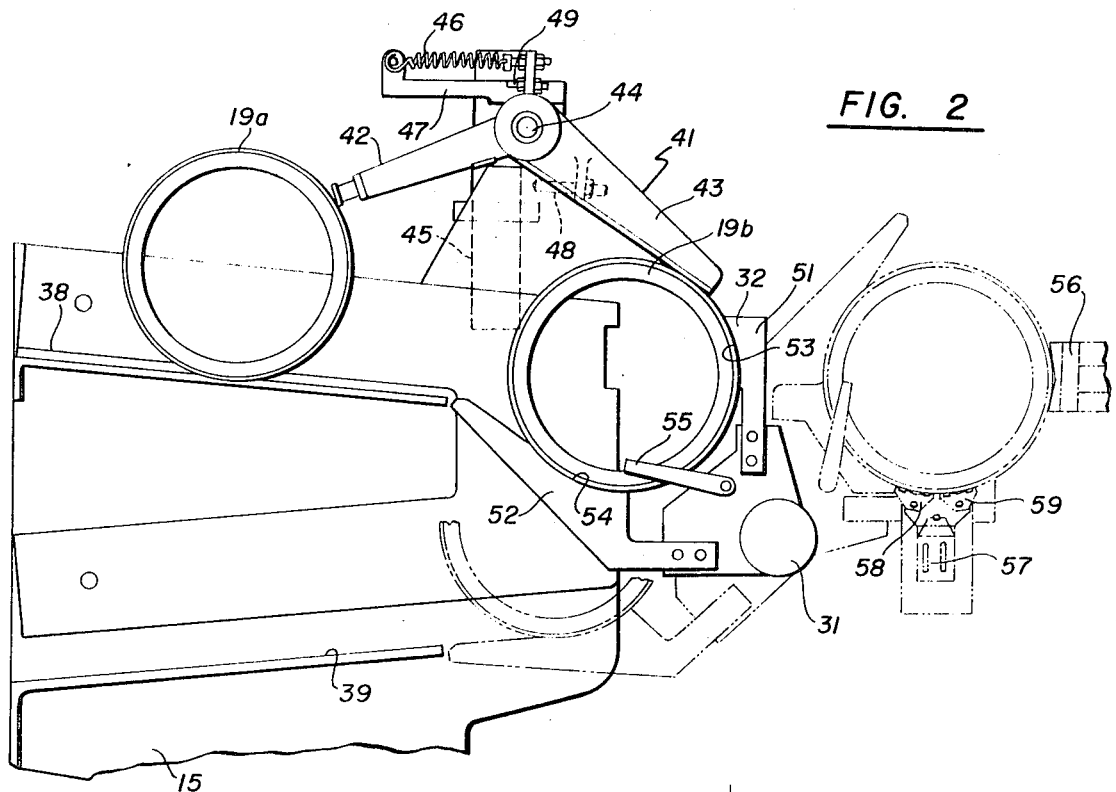
FIG. 2 is an enlarged sectional view of the machine tool taken on the line II—II of FIG. 1.

Referring now to FIG. 2, it can be seen that the support 15 carries an input chute 38 and an output chute 39, the former being inclined downwardly toward the work area and the latter being inclined downwardly away from the work area. Mounted at the top of the support is an escapement mechanism 41 consisting of two fingers 42 and 43 mounted on an axial shaft 44. The shaft is rotatable by means of a hydraulic cylinder 45 and is biased in the counterclockwise direction by a coil spring 46 operating on a bellcrank 47 keyed to the shaft. An adjustable stop 48 engages the finger 42 to limit rotation in the clockwise direction, while a similar adjustable stop 49 limits motion in the clockwise direction. The transfer arm 32 is shown as having two fingers 51 and 52, each of which have cylindrical surfaces 53 and 54, respectively, which lie on the same imaginary cylindrical surface of approximately the same diameter as the outer surface of the workpiece. A small finger 55 is located at the outer end of the transfer arm between the fingers 51 and 52 to limit endwise movement of the workpiece during transfer. It can be seen that the workhead is provided with an adjustable shoe 56 adapted to engage a workpiece at the 3 o'clock position; while a support 57 carries self-adjusting pivoted shoes 58 and 59 that contact the workpiece in the vicinity of the 6 o'clock position.

Figure 3:
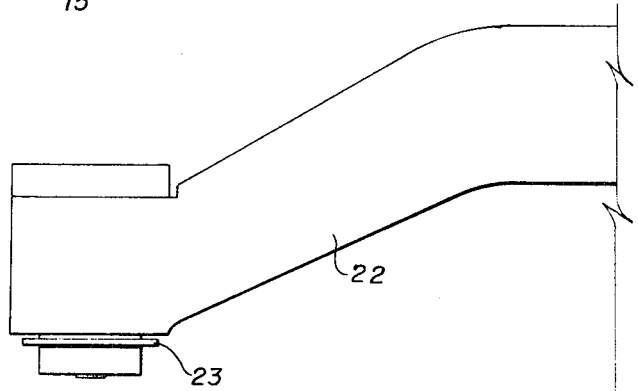
FIG. 3 is a partially sectioned view of a clamping means forming part of the machine tool.
Figure 3:
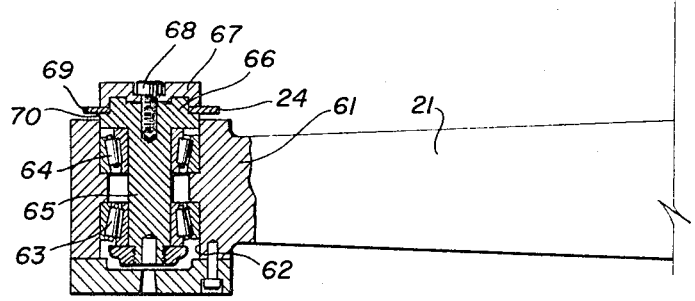

FIG. 3 shows the details of construction of the clamping means with its arms 21 and 22 and its rollers 23 and 24. The arm in the area of the roller 24 is broken away to show that a hub 61 at the end of the arm 21 is provided with a bore 62 carrying spaced roller bearings 63 and 64. The bearings support for rotation a shaft 65 whose outer end is provided with an integral inner hub member 66. Concentric with and fastened to the inner hub member is an outer hub member 67. A quick-release fastener 68 locks the two together and serves to clamp between them a disc 69 of hardened metal. The periphery of the disc extends well beyond the peripheries of the hub members 66 and 67 and a gap 70 lies between the disc and the adjacent shoulder of the hub 61 of the arm 21.

In operation, the movements of the transfer arm 32 and of the escapement mechanism 41 are coordinated by the operation of valves controlling the flow of hydraulic fluid to and from their respective operating cylinders 33 and 45. With the fingers 51 and 52 located in the position shown in solid lines in FIG. 2, the workpiece 19b can roll down the input chute 38 into the cradle formed by the fingers, the finger 43 of the escapement mechanism guiding this motion. The shaft 31 is rotated in the clockwise direction until the workpiece engages the support shoes 56, 58 and 59. In this work position, the workpiece is engaged by the rollers 23 and 24 of the clamping means (as shown in FIG. 1) and pressed axially against the driving platen forming part of the spindle 17 of the workhead. The workhead with the workpiece is advanced longitudinally and the wheelhead 13 is fed transversely to bring about the usual grinding cycle. During grinding, the fingers of the transfer arm partially surround the workpiece, but remain out of contact with and do not interfere with the grinding operation. After grinding is finished, the workhead is returned to its original loading position adjacent the chute support 15, and the shaft 31 is rotated in the counterclockwise direction to deposit the finished workpiece in the output chute 39.

While the transfer arm 32 is moving the workpiece in the work position, the escapement mechanism is moving in the counterclockwise direction to move the finger 43 out of the way and to present the finger 42 in front of the leading workpiece 19a in the chute to prevent it from following its predecessor. When the transfer arm moves to the unloading position, the fingers 42 and 43 are rotated in the clockwise direction to allow the entire row of unfinished workpieces in the chute 38 to roll downwardly until the leading workpiece strikes and is stopped by the finger 43. At that time, the finger 42 is raised out of the way.

It will be understood that the clamping means is brought into operation before grinding begins, and the periphery of the hardened metal disc 69 of the roller 24 and the corresponding disc of the roller 23 engage the annular end of the workpiece. Since the discs are of considerably greater diameter than the hub members that hold them, they can be subjected to considerable wear before they need replacement. When replacement becomes necessary, however, it is a simple matter to operate the fastener 68 and remove the hub member 67 to substitute a new disc for the old one.

From the above description it can be seen that, even though the chute support, chutes, and escapement mechanism are constructed as ruggedly as is necessary for use with large, heavy workpieces, and even though the input and output chute may be full of such workpieces, nevertheless, the rapid movements of the workhead 12 are not affected. Furthermore, if such equipment were mounted on the workhead, the variation of total workhead mass would vary greatly, due to variations from time to time in the number of workpieces stored in the chutes. Such variations in mass would produce variations in the grinding cycle which would produce variations in the finish of the successive finished workpieces produced by the machine tool. The present invention, of course, avoids this difficulty. In addition, particularly when the workpieces are large, the loading chute represents a large mass; this is especially true when the chute is full of heavy workpieces. By mounting the chute on the base instead of the workhead, the total mass that must be moved with the workhead is reduced, thus making it easier to produce the longitudinal motions in the grinding cycle and permitting them to be brought about with greater accuracy. Because the longitudinal ways are under the workhead, the forces on the ways are in the downward direction, which situation is particularly useful with hydrostatic ways.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

We claim:

1. A machine tool for finishing a workpiece having an outer surface of revolution, comprising
   a. a base,
   b. a workhead mounted on the base for movement along a path extending longitudinally thereof, the workhead being provided with a support to hold the workpiece for revolution about the axis of the surface of revolution, a rotatable platen contacting one end of the workpiece to rotate it about the axis and a clamp engaging the other end to press the workpiece against the platen, the workpiece being provided with a bore generally concentric with the axis, so that it has a flat annular end surface for engagement with the clamp, the clamp consisting of two spaced arms, each arm having a roller for engaging diametrically opposite portions of the end of the workpiece, the rollers rotating about an axis extending through the workpiece axis at a right angle thereto, each roller being mounted in an anti-friction bearing and consisting of two readily separable hub members between which is clamped a replaceable disc of hardened metal whose outer periphery extends beyond the hubs a substantial distance to engage the end surface of the workpiece,
   c. a toolhead mounted on the base for movement transversely thereof,
   d. a chute mounted on the base beside the path of the workhead,
   e. an escapement mechanism mounted on the chute for releasing workpieces one at a time,
   f. a transfer arm mounted on the workhead for swinging action about an axis extending parallel to the said path, and
   g. means operative on the workhead to move it along the said path from a first position where the transfer arm is adjacent the chute to a second position adjacent the toolhead.

2. A machine tool as recited in claim 1, wherein an output chute underlies the first-mentioned chute and wherein the transfer arm is movable from a first position wherein it embraces a workpiece held in the workhead for a machining operation to a second position wherein the workpiece can roll from the arm to the output chute to a third position wherein the arm can receive a workpiece from the first-mentioned chute.

3. A machine tool as recited in claim 2, wherein the escapement mechanism includes two fingers intersecting at a substantial angle and mounted at their intersection for pivotal movement about an axis parallel to the said path.

4. A machine tool as recited in claim 2, wherein the transfer arm includes two fingers arranged at a substantial angle to one another to form an enclosure to receive a workpiece of circular cross-section, each finger having a curved surface of substantially the same radius of curvature as the workpiece.

5. A machine tool as recited in claim 1, wherein the workhead can be swivelled about a vertical axis to a selected angle relative to the said path of movement, and wherein the chute can be swivelled to the same selected angle of adjustment as the workhead.

6. A machine tool as recited in claim 5, wherein the longitudinal motion of the workhead takes place along hydrostatic ways and the machining forces are in the downward direction.

7. A machine tool for use in finishing heavy workpieces each having a surface of revolution, comprising
 a. a base,
 b. a workhead mounted on the base for rapid reciprocatory movement along a path extending longitudinally thereof,
 c. a toolhead mounted on the base for movement transversely thereof,
 d. a chute fixedly mounted on the base beside the path of the workhead, the chute being formed to store a plurality of workpieces,
 e. a transfer arm mounted on the workhead for swinging action about an axis extending parallel to the said path,
 f. an escapement mechanism mounted on the chute for releasing workpieces one at a time to the transfer arm to be moved to the workhead, and
 g. means operative on the workhead to move it along the said path from a first position where the transfer arm is adjacent the chute for introducing a workpiece to the workhead to a second position adjacent the toolhead for performing the operation of the workpiece.

* * * * *